United States Patent
Sasaki et al.

(10) Patent No.: US 6,498,860 B1
(45) Date of Patent: Dec. 24, 2002

(54) INPUT POSITION DETECTION DEVICE AND ENTERTAINMENT SYSTEM USING THE SAME

(75) Inventors: Nobuo Sasaki; Akio Ohba, both of Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/322,775

(22) Filed: May 28, 1999

(30) Foreign Application Priority Data

Jun. 1, 1998 (JP) .......................................... 10-151526

(51) Int. Cl.[7] ................................................ G06K 9/00
(52) U.S. Cl. ..................................................... 382/103
(58) Field of Search ................................ 382/100, 103, 382/206, 276, 291, 305, 311, 312, 313, 320; 340/545.2, 870.01; 463/39, 51; 345/158; 725/81, 123; 250/330, 332, 334, 338.1, 339.02, 334.14, 347, 349; 348/164

(56) References Cited

U.S. PATENT DOCUMENTS

| | | | | |
|---|---|---|---|---|
| 5,388,059 A | * | 2/1995 | DeMenthon | 702/153 |
| 5,759,044 A | * | 6/1998 | Redmond | 434/307 R |
| 5,786,804 A | * | 7/1998 | Gordon | 345/158 |
| 5,793,630 A | * | 8/1998 | Theimer et al. | 700/11 |
| 5,855,483 A | * | 1/1999 | Collins et al. | 434/322 |
| 5,881,178 A | * | 3/1999 | Tsykalov et al. | 382/260 |

FOREIGN PATENT DOCUMENTS

| | | | | |
|---|---|---|---|---|
| JP | 2-304680 | 12/1990 | ........... | G06F/15/62 |
| JP | 4-148806 | 5/1992 | ........... | G01B/11/00 |

* cited by examiner

Primary Examiner—Andrew W. Johns
Assistant Examiner—Shervin Nakhjavan
(74) Attorney, Agent, or Firm—Katten Muchin Zavis Rosenman

(57) ABSTRACT

An input position detection device for detecting an input position of an input device, and an entertainment system which can detect the position of a subunit and has a display which displays an image generated by execution of a program loaded into the entertainment system. The entertainment system has a portable game terminal held by the operator. The portable game terminal is equipped with an infrared input/output unit which sends infrared signals corresponding to the commands of the operator to an infrared input/output device which is connected to a monitor device 6. The infrared input/output device and the CCD camera are disposed adjacent each other and point in the direction of the operator holding the portable game terminal. A game machine main unit detects the position of the portable game terminal based on the difference between an input image from the CCD camera taken immediately before the operator, sends an infrared signal from the infrared input/output unit of the portable game terminal toward the infrared input/output device, and the input image at the time that the infrared signal is sent.

13 Claims, 7 Drawing Sheets

INPUT POSITION DETECTION DEVICE AND ENTERTAINMENT SYSTEM USING THE SAME

BACKGROUND OF THE INVENTION

1. Field of the Invention

The present invention relates to an input position detection device for detecting an input position by means of an input device equipped with first infrared transceiving means and entertainment system which includes a main unit that has program execution functions and a subunit equipped with an interface and infrared transceiving means for connecting to the main unit.

2. Description of the Prior Art

In a video game player machine which is a specific example of an entertainment system, player characters and objects and the like are displayed on a monitor device such as a television receiver connected to the main unit of the game machine, and an input controller is used to cause the characters or objects to jump and move or the like as a role-playing game, racing game or the like proceeds.

The game proceeds assuming that the player normally views the monitor device from the front. For this reason, the player is required to be positioned in front of the monitor device.

However, depending on the situation of the room in which the monitor device is placed, it may be difficult for the player to be positioned directly in front of the monitor device.

In addition, when two people each use their own input controllers to play a head-to-head type game, it may be difficult for both players to be positioned directly in front of the monitor device.

SUMMARY OF THE INVENTION

It is an object of the present invention to provide an input position detection device that can detect the input position of an input device accurately and simply, and thus detect the position of the subunit and display an image generated by the execution of a program along the line of sight centered about that position, thereby setting the point of view optimally suited to the player.

These and other objects are attained by an input position detection device for detecting an input position by means of an input device equipped with first infrared transceiving means, comprising second infrared transceiving means that sends infrared signals to and receives infrared signals from the first infrared transceiving means of said input device, and image pickup means for picking up an image in a stipulated direction. The image pickup means and the second infrared transceiving means are disposed adjacently and point in a stipulated direction, and the input position of the input device in the stipulated direction or the vicinity thereof is detected based on the difference between an image picked up by the image pickup means that contains an infrared signal for position detection from the second infrared transceiving means of the input device in the stipulated direction or the vicinity thereof and an immediately previous image that does not contain an infrared signal for position detection.

Moreover, in the entertainment system comprising a main unit that has program execution functions and a subunit equipped with an interface and first infrared transceiving means for connecting to the main unit, the main unit has a second infrared transceiving means that sends and receives infrared signals to and from the first infrared transceiving means of the subunit, and image pickup means for picking up an image in a stipulated direction disposed adjacently with the second transceiving means and pointed in a stipulated direction, wherein the input position of the subunit in said stipulated direction or the vicinity thereof is detected based on the difference between an image picked up by the image pickup means that contains an infrared signal for position detection from the infrared transceiving means of the subunit in the stipulated direction or the vicinity thereof and an immediately previous image that does not contain an infrared signal for position detection.

Here, the main unit is connected to display means that displays images generated by the execution of programs, and said infrared transceiving means and said image pickup means are disposed near this display means.

In addition, the subunit has a unique identification number and the identification number information is contained in infrared light emitted toward said main unit. In addition, the subunit has a unique identification number and when the identification number is sent from the main unit to the subunit by means of infrared signals, a determination is made as to whether or not the identification number is equal to a unique identification number.

DETAILED DESCRIPTION OF THE PREFERRED EMBODIMENTS

Here follows an explanation of the embodiment of the input position detection device and entertainment system according to the present invention with reference to the figures of the drawings. This embodiment is a video game player machine 1 consisting of a game machine main unit 2 that has program execution functions and a portable game terminal 3 equipped with an interface for making a wireless connection to the game machine main unit, while the game machine main unit is equipped with functions as an input position detection device that detects the input position from the portable game terminal.

Figure 1:
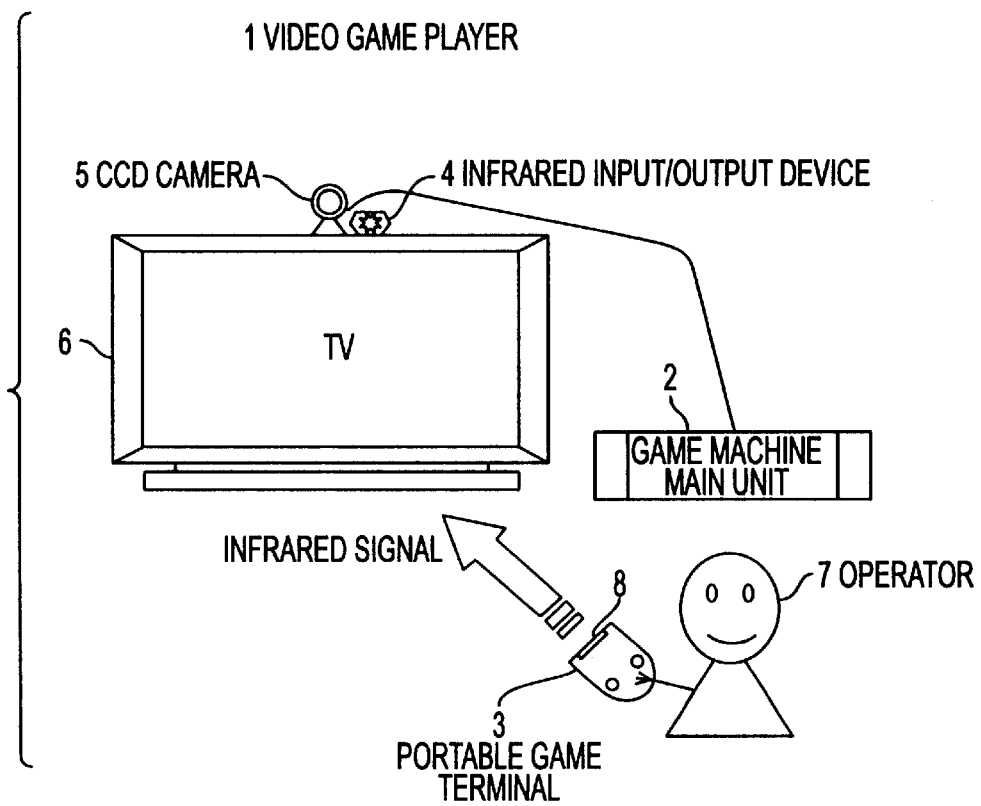
FIG. 1 is a block diagram showing the configuration of a video game player machine as an embodiment of the input position detection device and entertainment system according to the present invention.

FIG. 1 shows the video game player machine 1 which consists of the game machine main unit 2 and the portable game terminal 3. The game machine main unit 2 is connected to an infrared input/output device 4, a CCD camera 5 serving as the image pickup means and a monitor device 6 such as a television receiver.

The portable game terminal 3 is held by an operator 7. The portable game terminal 3 is equipped with an infrared input/output unit 8 which sends infrared signals corresponding to the commands of the operator 7 to the infrared input/output device 4.

Here, the infrared input/output device 4 connected to the monitor device 6 and the CCD camera 5 are disposed adjacent to each other and point in the direction of the operator 7 holding the portable game terminal 3. The game machine main unit 2 detects the position of the portable game terminal 3 based on the difference between an input image from the CCD camera 5 taken immediately before the operator 7 sends an infrared signal from the infrared input/output unit 8 of the portable game terminal 3 toward the infrared input/output device 4, and the input image at the time that the infrared signal is sent. The portable game terminal 3 has a unique identification number and this identification number information is contained in the infrared signal sent toward the game machine main unit 2.

Figure 2:
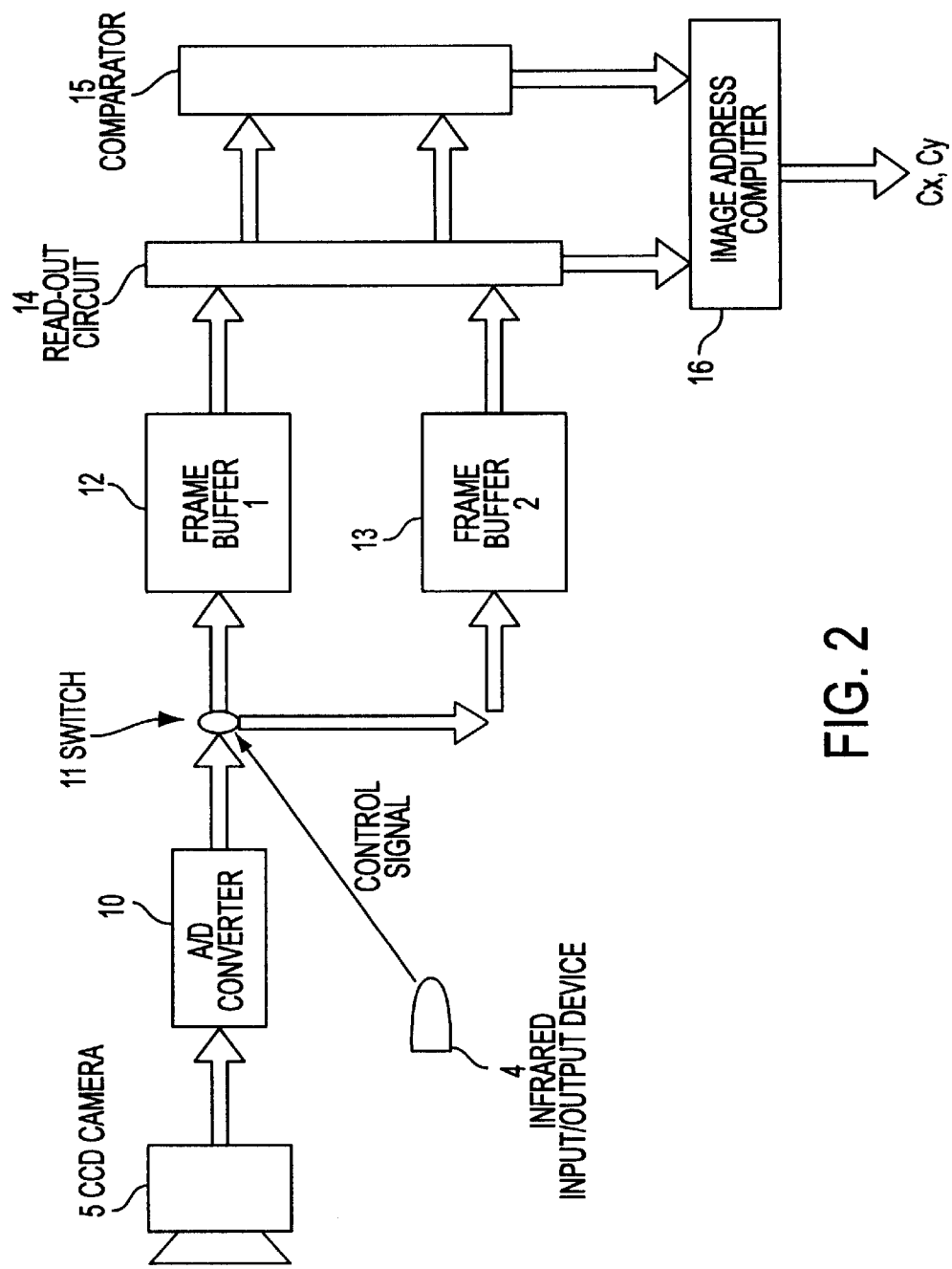
FIG. 2 is a block diagram showing the detailed configuration of parts of the aforementioned video game player machine.

As shown in FIG. 2, the game machine main unit 2 consists of an A/D converter 10 that converts the image picked up by the CCD camera 5 into a digital signal, a switch 11 that changes positions when an infrared signal for position detection is supplied from the infrared input/output device 4, two frame buffers 12 and 13; a read-out circuit 14, a comparator 15 and an image address computer 16.

Figure 3:
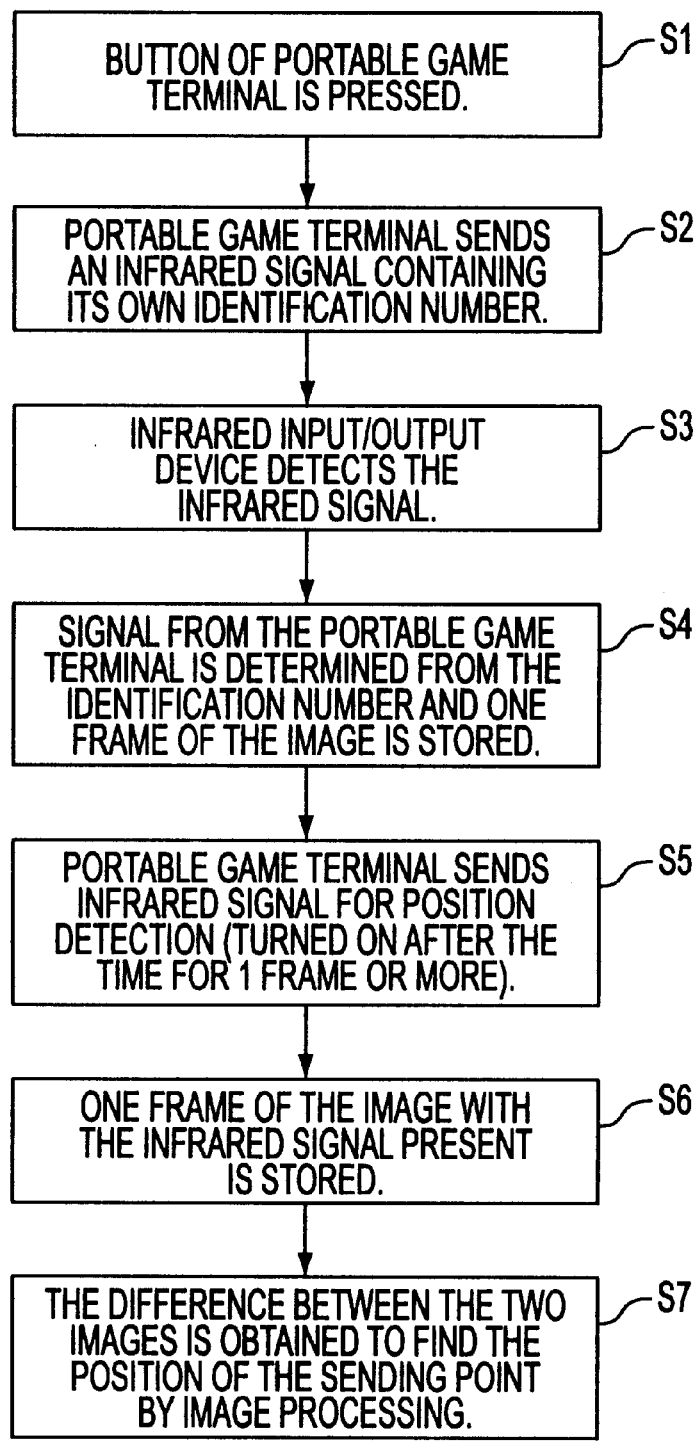
FIG. 3 is a flowchart for explaining the operation of the aforementioned video game player machine.

Next, the operation of the video game player machine 1 will be described using the flowchart shown in FIG. 3. First, in Step S1, the operator 7 presses the infrared signal send button of the portable game terminal 3. Then, in Step S3, the portable game terminal 3 sends from the infrared input/output unit 8 an infrared signal containing its own identification number.

The infrared input/output device 4 connected to the game machine main unit 2 detects the infrared signal from the infrared input/output unit 8 sent in Step S3. Then, the signal from the portable game terminal 3 is determined from the identification number contained in the infrared signal detected in Step S4, and after the image picked up by the CCD camera 5 is converted into a digital image signal by the A/D converter 10, one frame is stored in frame buffer 12.

In Step S5, when the infrared signal for position detection from the portable game terminal 3 is sent for a length of time equal to or longer than one frame, in Step S6 the game machine main unit 2 uses the CCD camera 5 to pick up an image containing the infrared signal for position detection being sent and, through the A/D converter 10 and switch 11, stores one frame in frame buffer 13.

Lastly, in Step S7, the image address computer 16 reads out digital image signals from the frame buffers 12 and 13 via the read-out circuit 14, and after the comparator 15 compares the signals and finds the difference, finds the position of the point of origin by means of image processing.

To wit, one frame of the image input from the CCD camera 5 is held in the frame buffer 12 in advance, and once the infrared signal for position detection is detected, the position of the portable game terminal 3 is detected by taking the difference between the CCD camera input image prior to the infrared signal being sent, which was stored in frame buffer 12, and the CCD camera input image after the infrared signal is sent, which was stored in frame buffer 13.

In addition, the infrared signal also contains the identification number of the portable game terminal 3, so it is possible to determine which portable game terminal is at which position.

Figure 4:
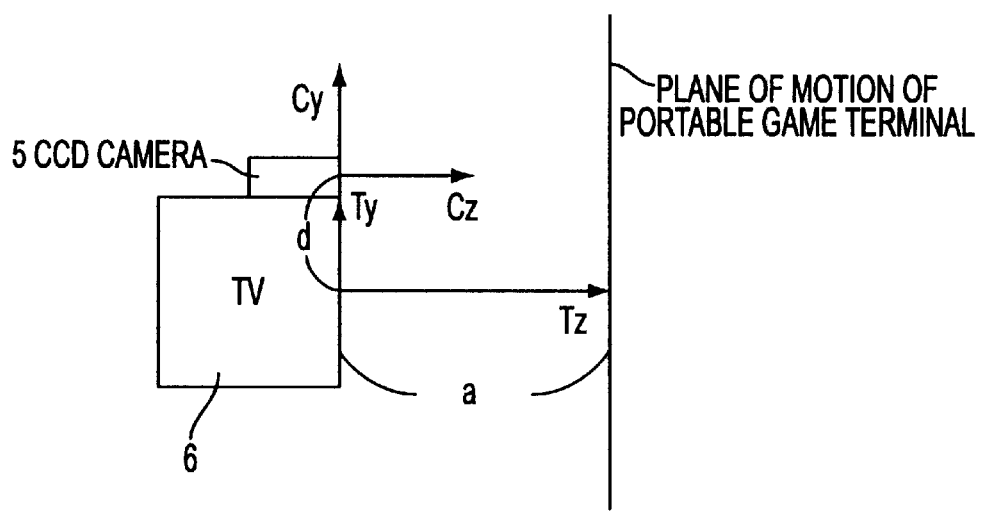
FIG. 4 is a diagram used for explaining the computational algorithm of the image address computer constituting the video game player machine.

The image address computer 16 estimates the actual spatial coordinates from the CCD camera image coordinates by means of an algorithm that can be explained using FIG. 4 below. Here, the center of the screen of the monitor device (TV) 6 is the origin of a TV coordinate system having the Tz axis in the direction perpendicular to the screen of the TV 6, a Tx axis to the right when facing the screen and a Ty axis in the upward direction.

Assume that the screen direction of TV 6 and the line-of-sight direction of CCD camera 5 are parallel and that the CCD camera 5 is positioned exactly at the origin of the TV coordinate system. Taking the center of the lens of CCD camera 5 to be the origin, the Cz axis is in the forward direction perpendicular to the screen, the Cx axis is the direction to the right when looking at the CCD camera 5 and the Cy axis is in the upward direction. In addition, d is the distance from the origin of the CCD camera coordinate system to the origin of the TV coordinate system.

In the case of one CCD camera, it is only possible to determine the two-dimensional position of the portable game terminal 3, so in order to limit the degrees of freedom, the portable game terminal 3 is assumed to be present in a plane separated by a distance a from the TV.

Typically, if distortion of the lens is ignored, positions on a plane perpendicular to the z axis of the camera 5 are linearly mapped to the CCD. Thereby, if the portable game terminal moves within the aforementioned plane, there is a linear mapping between the coordinate system of the TV 6 and the coordinate system of the CCD camera 5. In the case of FIG. 4, it is sufficient to consider only the planar movement of d with respect to the y coordinate.

For this reason, the image address computer 16 can calculate $Tz=Cz$, $Ty=Cy+d$ and $Tx=Cx$. Therefore, in the video game player machine 1 the position of the player holding the portable game terminal 3 can be calculated. Then, it is possible to display the images generated by the execution of the program along a line of sight that assumes that position to be the center, so a point of sight optimized to the player can be given.

Figure 5:
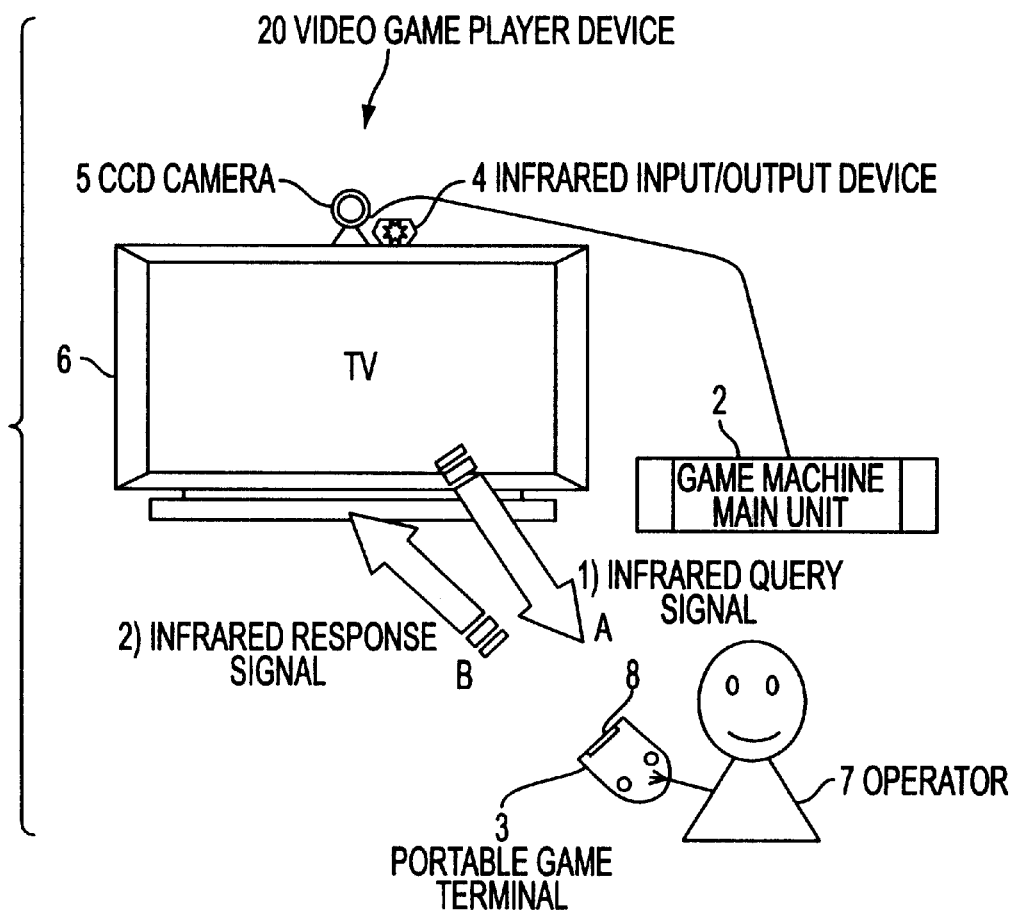
FIG. 5 is a block diagram showing the configuration of variation of the aforementioned video game player machine.

It should be noted that the input position detection device and entertainment system according to the present invention is in no way limited to the aforementioned application to a video game player device or machine 1. As shown in FIG. 5, it could also be applied to a video game player machine 20 wherein the identification number of a portable game terminal 3 that the game machine main unit 2 wishes to know is sent with an infrared signal. Arrow A indicates an infrared query signal; arrow B designates an infrared response signal.

Figure 6:
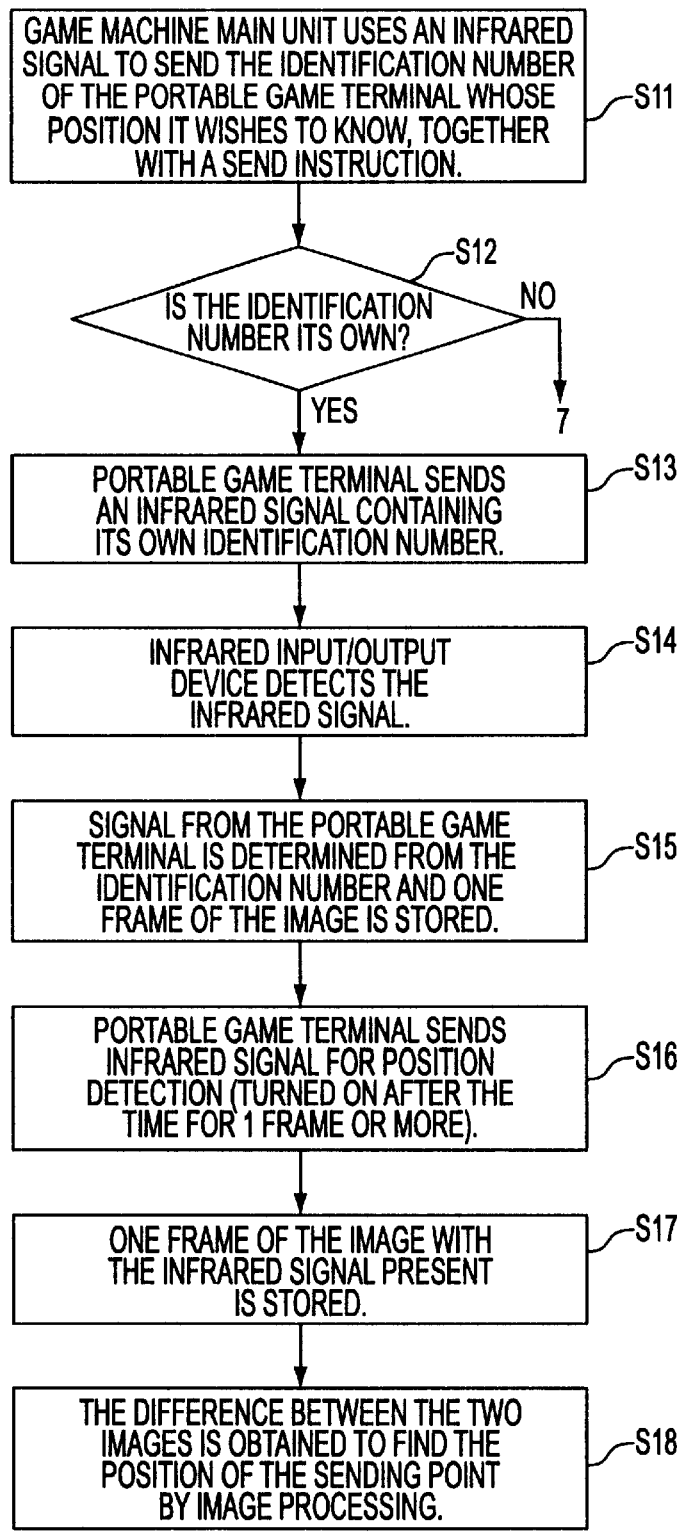
FIG. 6 is a flowchart used for explaining the operation of the embodiment shown in FIG. 5.

The video game player machine or device 20 operates in accordance with the flowchart shown in FIG. 6. To wit, in Step S11, the game machine main unit 21 uses an infrared signal to send the identification number of the portable game terminal 3 whose position it wishes to know, together with a send instruction. In Step S12, the portable game terminal 3 uses its own CPU to decode the signal received in the aforementioned infrared signal, and determine if the identification number in the query is equal to its own identification number.

In this Step S12, if the unit's own identification number is contained in the infrared query signal, then in Step S13 the portable game terminal 3 sends an infrared signal containing its own identification number as a response signal.

Upon doing this, in Step S14, the infrared input/output device 4 connected to the game machine main unit 2 detects the aforementioned infrared signal.

Then, from the identification number contained in the infrared signal detected in Step S15, the signal from the portable game terminal 3 is determined, and the image picked up from the CCD camera 5 is converted to digital image signals by the A/D converter 10 and then one frame is stored in the frame buffer 12.

In Step S16, when the infrared signal for position detection from the portable game terminal 3 is sent for a length of time equal to or longer than one frame, in Step S17 the game machine main unit 2 uses the CCD camera 5 to pick up an image containing the infrared signal for position detection being sent and, through the A/D converter 10 and switch 11, stores one frame in frame buffer 13.

Lastly, in Step S18, the image address computer 16 reads out digital image signals from the frame buffers 12 and 13 via the read-out circuit 14, and after the comparator 15 compares the signals and finds the difference, finds the position of the point of origin by means of image processing.

To wit, one frame of the image input from the CCD camera 5 is held in the frame buffer 12 in advance, and once the infrared signal for position detection is detected, the position of the portable game terminal 3 is detected by taking the difference between the CCD camera 5 input image prior to the infrared signal being sent, which was stored in frame buffer 12, and the CCD camera input image after the infrared signal is sent, which was stored in frame buffer 13.

Here, if there is one light emitting diode 8 attached to the portable game terminal 3, then two-dimensional position detection is possible. In addition, if there are two light emitting diodes attached at separate locations, it is possible to estimate the distance from the CCD camera 5 or detect the angle of rotation with respect to the screen. In addition, if there are three or more light-emitting diodes at separate locations, then it is possible to estimate the three-dimensional position and orientation of the portable game terminal. If necessary, the light timing of the individual light-emitting diodes can be shifted so that they are contained in separate frames so that it is possible to identify the light-emitting diode.

Moreover, the aforementioned video game players device or machine 1 and 20 can detect the position of the game player using the results of detecting the input position of the portable game terminal 3 calculated by the image address computer 16, and display a screen generated by the execution of the program along a line of site using that position as the center.

In a normal game, it is assumed that the player is viewing the screen of the TV 6 from directly in front of the screen. By converting to a viewpoint that puts the position of the player at the center, it is possible to set the viewpoint appropriately when playing on a large screen.

Figure 7:
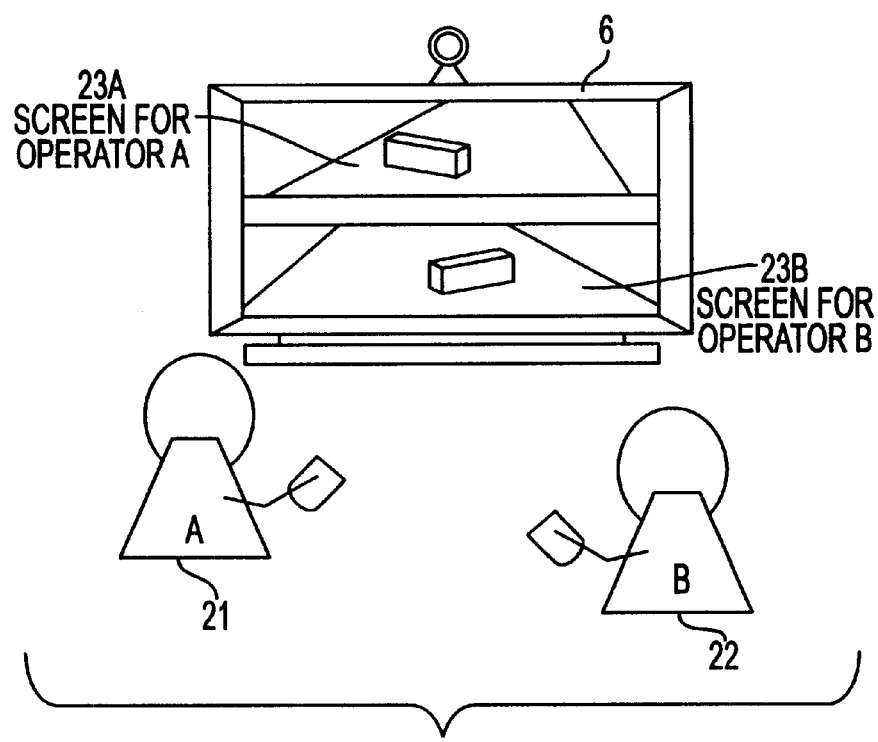
FIG. 7 is a diagram for explaining the operation of a video game player equipped with two portable game terminals.

In addition, as shown in FIG. 7, in the case of head-to-head play between operators A and B (21 and 22), it is possible to set appropriate viewpoints. In FIG. 7, the screen 23A for operator A 21 and the screen 23 B for operator B 22 on the screen of the TV 6 are each given viewpoints appropriate to each operator.

In addition, by using the input positions detected by means of the present invention, the direction of the gaze of characters on the screen can be pointed toward the position of the portable game terminal, so life-like eye contact can be expressed. In addition, it is possible to provide input of movement by compensating for the movement of the portable game terminal, so it can be used instead of a key pad or joystick or the like.

In this manner, by means of a system consisting of the video game players device or machine 1 and 20 in the aforementioned embodiment, along with a plurality of portable game terminals, it is possible to determine the positions of the operators from the positions of the portable game terminals serving as input devices, so various types of feedback can be achieved.

In addition, by inserting an identification number into the infrared signal, it is possible to determine the position and also which input device is there.

Moreover, by taking the difference of images, it is possible to measure the position accurately with a simple process. If necessary, a filter through which infrared light passes may be attached to the CCD camera to permit measurements to be made at an even higher S/N ratio.

By means of the present invention, it is possible to provide an input position detection device that can accurately and easily detect the input position of an input device, and also an entertainment system that can detect the position of a subunit and display an image generated by the execution of a program from a viewpoint with that position as its center.

What is claimed is:

1. An entertainment system comprising:
   a main unit which has program execution functions for execution of programs;
   a subunit including an interface and first infrared transceiving means for connecting to said main unit
   second infrared transceiving means for sending infrared signals to and receiving infrared signals from said first infrared transceiving means of said subunit,
   image pickup means for picking up an image in a stipulated direction, disposed adjacently to said second infrared transceiving means and pointing in a stipulated direction, and
   display means connected to said unit to display images generated by the execution of programs,
   wherein said second wireless transmitting aid receiving means and said image pickup means are disposed near said display means, and
   wherein an input position of said subunit in said stipulated direction or vicinity thereof is detected based on a difference between an image picked up by said image pickup means that contains an infrared signal for position detection from said first infrared transceiving means of said subunit in said stipulated direction or vicinity thereof and an immediately previous image that does not contain an infrared signal for position detection so that an image that is generated by the execution of a program is displayed on said display means on a line of sight from the position of the subunit so a point of sight optimized is attributed to a player operating said subunit.

2. The entertainment system recited in claim 1, wherein said subunit has a unique identification number and information about said unique identification number is contained infrared light emitted toward said main unit.

3. The entertainment system recited in claim 1, wherein said subunit has a unique identification number and when an identification number is sent from said main unit to said subunit by mew of infrared signals, a determination is made as to whether or not said identification number is equal to said unique identification number.

4. The entertainment system recited in claim 1, wherein said second infrared transceiving means comprises a plurality of units.

5. The entertainment system recited in claim 4, wherein said plurality of units further comprises light-emitting diodes that are set such that light emission timing of each light-emitting diode is offset.

6. The entertainment system recited in claim 1, wherein in the reception of an infrared signal by said first infrared transceiving means of said subunit, an image that does not contain an infrared signal for detection of said immediately previous position is obtained and at the same time, an image that contains an infrared signal for position detection is obtained in the receipt of an infrared signal at fixed times by said first infrared transceiving means of said subunit.

7. An entertainment system comprising:
   a CCD camera;
   an infrared input/output device;
   two frame buffers;
   an A/D converter for converting an image picked up by said CCD camera into a digital signal;
   a switch which when an infrared signal for position detection is supplied from said infrared input/output device, provides the output of sad A/D converter to one of said two frame buffers;
   a comparator for comparing contents of said two fine buffers; and
   an image address computer for estimating actual spatial coordinates from image coordinates of said CCD camera.

8. The entertainment system recited in claim 7, further comprising a monitor device wherein the estimation of the actual spatial coordinates from the image coordinates of said CCD camera is performed by a conversion of said image coordinates to coordinates of said monitor device.

9. An input position detection device for detecting an input position of an input device being operated by a player and for setting a point of view of an image generated on a display means that is optically suited to said player, said detection device comprising:
   a first infrared transmitting means provided on said input device,
   a first infrared receiving means for receiving infrared signals from said first infrared transmitting means, and
   an image pickup means associated with said first infrared receiving means and said display means for picking up an image related to said input device in a stipulated direction,
   wherein said image pickup means and said fist infrared receiving means are disposed adjacently each other and point in said stipulated direction,
   wherein said image pickup means and said display means are disposed adjacently each other,
   and wherein an input position of said input device in said stipulated direction or a vicinity thereof is detected based on a difference between an image picked up by said image pickup means that contains an infrared signal from said first infrared transmitting means in said stipulated direction or the vicinity thereof and an immediately previous image which does not contain an infrared signal from said first infrared transmitting means so that said image that is generated on said display means is displayed on a line of sight from the position of the input device so a point of sight optimized is attributed to a player operating said input device.

10. An input position detecting device in accordance with claim 9, wherein said first infrared receiving means is a first infrared transceiving means that also transmits infrared signals to said input device.

11. An input position detecting device in accordance with claim 10, wherein said first infrared transmitting means is a second infrared transceiving means that receives signals transmitted from said first infrared transceiving means.

12. An input position detecting device in accordance with claim 9, further comprising a first coordinate system associated with said image pickup means and a second coordinate system associated with said display means and wherein said point of sight is determined relative to a distance between said first and second coordinate systems.

13. An input positioning detecting device in accordance with claim 12, further comprising an image processing means for equating said first and second coordinate system data relative to said distance defined therebetween.

* * * * *